(12) United States Patent
Yamamoto

(10) Patent No.: US 8,157,398 B2
(45) Date of Patent: Apr. 17, 2012

(54) LIGHT SOURCE UNIT UTILIZING LASER FOR LIGHT SOURCE AND PROJECTOR

(75) Inventor: Kyo Yamamoto, Higashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 202 days.

(21) Appl. No.: 12/731,202

(22) Filed: Mar. 25, 2010

(65) Prior Publication Data

US 2010/0245776 A1    Sep. 30, 2010

(51) Int. Cl.
  *F21V 9/08*    (2006.01)
  *F21V 9/16*    (2006.01)
  *G03B 21/28*   (2006.01)

(52) U.S. Cl. .......... 362/84; 362/284; 362/324; 362/268; 353/38

(58) Field of Classification Search ............... 362/84, 362/277, 282, 284, 319, 322, 324, 449, 271, 362/254, 268; 353/38, 98
See application file for complete search history.

(56) References Cited

U.S. PATENT DOCUMENTS

| | | | |
|---|---|---|---|
| 4,894,760 A * | 1/1990 | Callahan | 362/293 |
| 6,874,893 B2 | 4/2005 | Park | |
| 7,891,823 B2 * | 2/2011 | Sato | 353/98 |
| 2006/0087847 A1 * | 4/2006 | Yamanaka | 362/277 |
| 2010/0238412 A1 * | 9/2010 | Kurosaki | 362/84 |
| 2010/0296061 A1 * | 11/2010 | Silverstein et al. | 353/38 |
| 2011/0249242 A1 * | 10/2011 | Saitou et al. | 362/84 |

FOREIGN PATENT DOCUMENTS

| | | |
|---|---|---|
| JP | 2000-267621 A | 9/2000 |
| JP | 2001-183741 A | 7/2001 |
| JP | 2003-233123 A | 8/2003 |
| JP | 2004-234001 A | 8/2004 |
| JP | 2006-301114 A | 11/2006 |
| JP | 2007-311731 A | 11/2007 |
| JP | 2008-015390 A | 1/2008 |
| JP | 2009-048028 A | 3/2009 |

OTHER PUBLICATIONS

Decision to Grant a Patent dated Feb. 3, 2011, and English translation thereof, issued in counterpart Japanese Application No. 2009-079857.

* cited by examiner

*Primary Examiner* — Bao Q Truong
(74) *Attorney, Agent, or Firm* — Holtz, Holtz, Goodman & Chick, PC

(57) ABSTRACT

A projector including a light source unit, a display device and a projector control means, wherein the light source unit includes a fluorescent plate 130 including fluorescent material layers 131 disposed adjacent for emitting light in predetermined wavelength ranges by absorbing light, a diffusion plate 140 including a diffusion layer 141 disposed adjacent to the fluorescent material layers 131 for emitting light in a diffusing fashion, a light source for shining light on the layers 131, 141, a driving device for rotating the plates 130, 140, and a light cut-off plate 160 having a light cut-off portion 161, the light cut-off plate 160 capable of rotating together with the plates 130, 140 and movable so that the light cut-off portion 161 covers an area on the diffusion plate 140 where light is to be shone by the locked state being released when the diffusion plate 140 comes off.

14 Claims, 8 Drawing Sheets

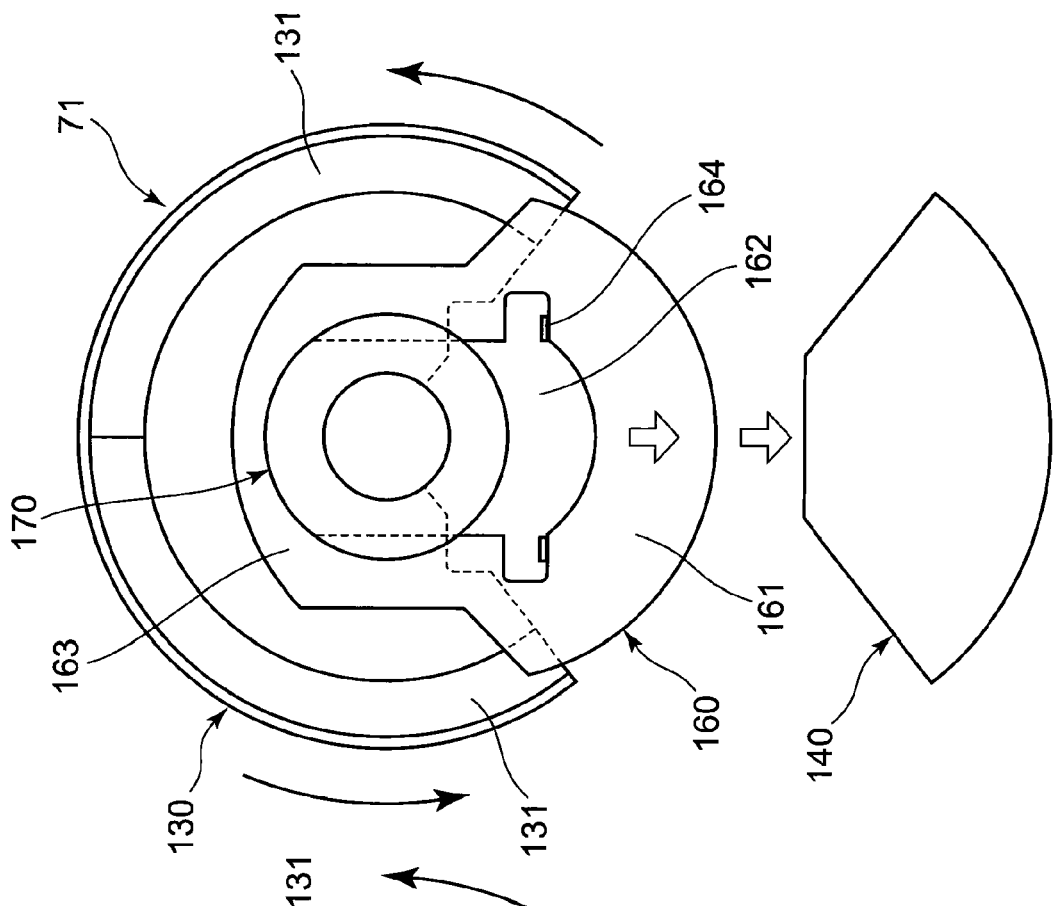

LIGHT SOURCE UNIT UTILIZING LASER FOR LIGHT SOURCE AND PROJECTOR

CROSS-REFERENCE TO RELATED APPLICATIONS

This application is based upon and claims the benefit of priority under 35 USC 119 of Japanese Patent Application No. 2009-079857 filed on Mar. 27, 2009, the entire disclosure of which, including the description, claims, drawings and abstract, is incorporated herein by reference.

BACKGROUND OF THE INVENTION

1. Field of the Invention

The present invention relates to a light source unit and a projector including this light source unit.

2. Description of the Related Art

In these days, data projectors are used in many cases as image projection apparatuses which project screens or video images of personal computers and further images based on image data stored in memory cards on to a screen. These projectors are such that light emitted from a light source is concentrated on a micromirror device called a DMD (Digital Micromirror Device) or a liquid crystal plate for display of a color image on the screen.

In projectors of the type described above, conventionally, projectors using a high-intensity discharge lamp as a light source have been the mainstream of projectors. In recent years, however, there have been made many developments and proposals on light source units which use as a light source, a solid-state light emitting device such as a light emitting diode, a laser diode or an organic DL. For example, the applicant of this patent application has already proposed a light source unit including a light source for emitting light in the wavelength range of blue and a light emitting wheel which has a fluorescent material layer which absorbs light emitted from the light source to convert the light into visible light and which is driven to rotate by a motor and a projector including this light source unit.

In this light source unit, three colors of light, red, green and blue, can be emitted sequentially from the light emitting wheel (a rotary plate), on which a fluorescent material layer as a light emitting member and a diffusion layer are placed to lie adjacent to each other circumferentially, by shining directional blue light on to the light emitting wheel.

Here, the light emitting wheel of the light source unit is normally formed by bonding a fluorescent plate and a diffusion plate to a rotating shaft of the motor, for example. The fluorescent plate includes integrally a member having a fluorescent material layer which emits light in the wavelength range of red and a member having a fluorescent material layer which emits light in the wavelength range of green, and the diffusion plate which is placed adjacent to the fluorescent plate and which diffuses light in the wavelength range of blue from the light source for emission.

In a case where the light emitting wheel is formed in the way described above, the fluorescent plate which is formed of a metal has a fan-like shape having an arc larger than a semicircle and has a circular opening portion into which the rotating shaft of the wheel motor can securely be fitted. Since the wheel motor is installed in this opening portion so as to penetrate therethrough, the light emitting wheel is fixed firmly. In contrast to this, the diffusion plate which is formed of a resin or glass has a fan-like shape having an arc smaller than a semicircle and is secured to the rotating shaft of the wheel motor and the fluorescent plate only through bonding.

Consequently, there has been a possibility that the diffusion plate which is bonded to the fluorescent plate comes off due to deterioration with age thereof or external shock or vibration imposed thereon. Because of this, in order to prevent light from the light source from being emitted directly to the outside of the light source unit, there has been a need to have a countermeasure for stopping the operation of the light source by detecting the coming off of the diffusion plate by a controlling means.

In addition, in projectors which utilize a high output light source such as a laser light source, various proposals have been made for adoption on means for preventing light outputted from the light source from being emitted directly to the outside of a light source unit. For example, Japanese Unexamined Patent Application No. 2000-267621 proposes a picture display system including a light source for emitting laser light, a beam converting means such as a lens for converting a beam of laser light from the light source into a thick beam, an image generating means for generating an image by the beam of laser light whose thickness has been so converted, a detection means such as a photosensor for detecting whether or not the beam converting means operates normally, and a laser light limiting means for stopping or attenuating the radiation of laser light based on information from the detection means or a picture display device as a cut-off means which is provided on an optical path for cutting off laser light.

In the picture display system described above, the attenuation or stoppage of radiation of laser light is implemented or the cutting off of laser light is implemented based on the information from the detection means, thereby making it possible to prevent a direct emission of high-output laser light to the outside of the light source unit.

Although various countermeasures like the proposal described above have been adopted, since there is a need to include the detection means such as the photosensor and the control unit such as the laser light limiting means which is activated to operate based on information from the detection means, a problem has been caused that the configuration of the picture display system becomes complex, resulting in an increase in production costs. In addition, in the event that there occurs a situation in which laser light is outputted to the outside by an unforeseen condition, the light source is attenuated or stopped or light from the light source is cut off by the information from the detection means being inputted into the control means. Because of this, there has been caused a problem that a slight time lag is generated in implementing such an attenuating or stopping operation or light cut-off operation.

SUMMARY OF THE INVENTION

The invention has been made in view of the problems inherent in the related art, and an object thereof is to provide a light source unit which can prevent the emission of directional high-output light to the outside in an ensured fashion in the event that a diffusion plate comes off and a projector including the light source unit.

According to one preferred aspect of the invention, there is provided a light source unit comprising:

a fluorescent plate on which different fluorescent material layers for emitting light in predetermined wavelength ranges when light is shone thereonto are disposed adjacent in a circumferential direction;

a diffusion plate on which a diffusion layer for emitting light in a diffusing fashion is disposed so as to lie adjacent to the fluorescent material layers;

a light source for shining the light on to the fluorescent material layers and the diffusion layer;

a driving device for rotating the fluorescent plate and the diffusion plate together; and a light cut-off plate which is formed into a size which can cover an area on the diffusion plate where the light is to be shone, wherein the light cut-off plate is enabled to rotate together with the fluorescent plate and the diffusion plate by being locked by the diffusion plate, and wherein when the diffusion plate comes off, the locked state is released, and the light cut-off plate moves to cover the area on the diffusion plate where the light is to be shone so as to cut off light from the light source.

BRIEF DESCRIPTION OF THE DRAWINGS

The above and further objects, characteristics and advantages of the invention will be more obvious from accompanying drawings and the following detailed description of the invention. In the drawings, FIG. 8 is an exemplary front view as viewed from a light source side which shows an operation of the light cut-off plate of the light source unit according to the invention.

DETAILED DESCRIPTION OF THE PREFERRED EMBODIMENT

Figure 1:
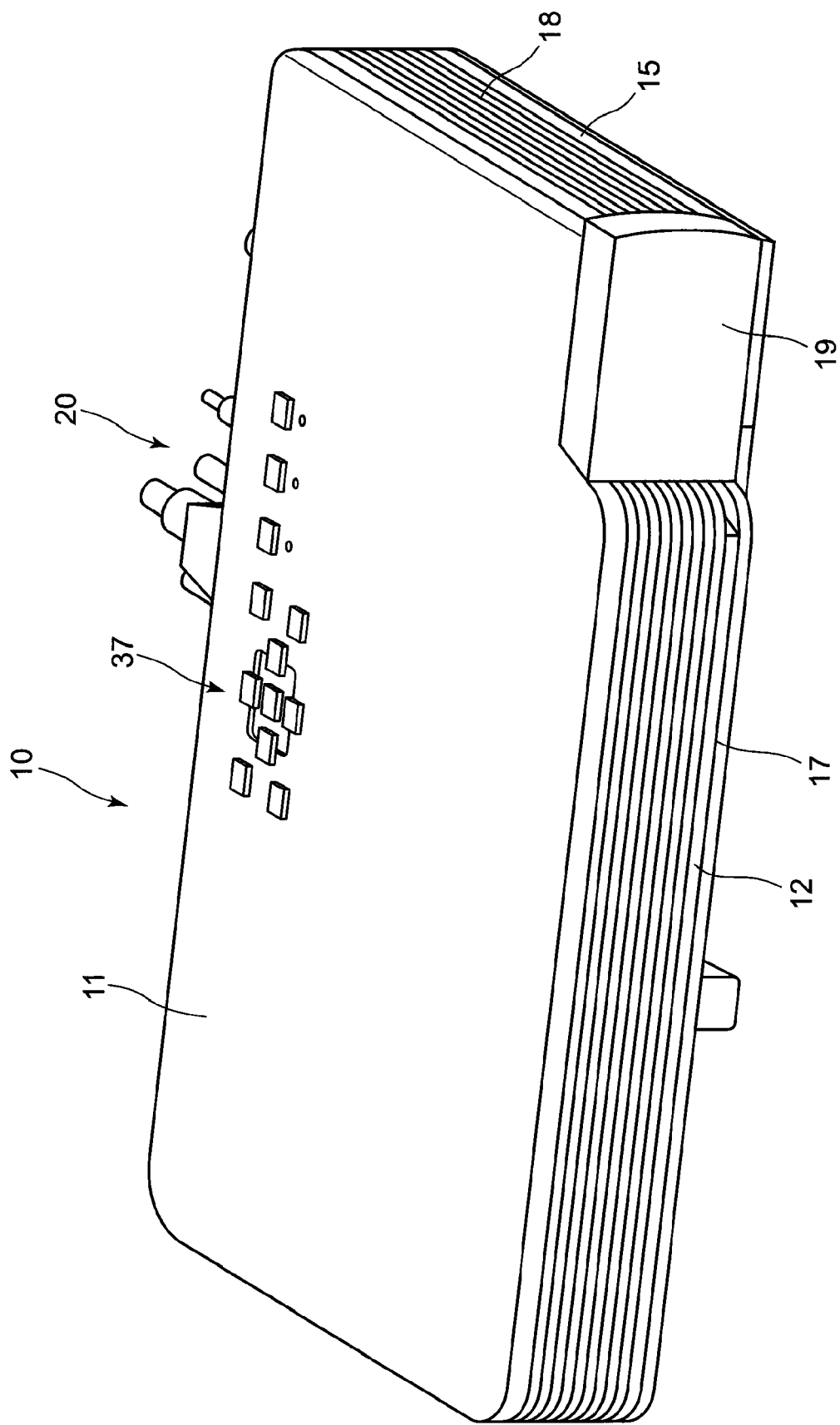
FIG. 1 is a perspective view showing an external appearance of a projector which utilizes a light source unit according to the invention.

Hereinafter, a best mode for carrying out the invention will be described by use of the accompanying drawings. However, in the following embodiment, although various preferred technical limitations will be described as being made for carrying out the invention, the scope of the invention is not limited at all to the following embodiment and illustrated examples.

Firstly, a summary of a mode for carrying out the invention will be described.

A projector 10 includes a light source unit 63, a display device 51, a cooling fan, a light source side optical system 62 for guiding light from the light source unit 63 to the display device 51, a projection side optical system 90 for projecting an image emitted from the display device 51 on to a screen, and a projector control means for controlling the light source unit 63 and the display device 51.

This light source unit 63 includes a fan-shaped fluorescent plate 130 on which different fluorescent material layers 131 for emitting light in predetermined wavelength ranges by absorbing directional light are disposed adjacent in a circumferential direction, a fan-shaped diffusion plate 140 on which a diffusion layer 141 for emitting directional light in a diffusing fashion is disposed so as to lie adjacent to the fluorescent material layers 131, a light source 72 for shining the light on to the fluorescent material layers 131 and the diffusion layer 141, a wheel motor 73 as a driving device for rotating the fluorescent plate 130 and the diffusion plate 140 together, and a light cut-off plate 160 having a light cut-off portion 161 which is formed into a size which can cover an area on the diffusion plate 140 where the light is to be shone.

In addition, by being locked by the diffusion plate 140, the light-cut off plate 160 is held in a predetermined position relative to the fluorescent plate 130 and the diffusion plate 140 so that the light cut-off portion 161 is not disposed on an optical axis of the light source 72 and is enabled to rotate together with the fluorescent plate 130 and the diffusion plate 140. This light cut-off plate 160 is configured so that when the diffusion plate 140 comes off, the locked state between the light cut-off plate 160 and the diffusion plate 140 is released so that the light cut-off portion 161 moves to cover the area on the diffusion plate 140 where the light is to be shone by virtue of centrifugal force. Namely, this light cut-off plate 160 is configured so as to cut off directional light from the light source 72 momentarily the diffusion plate 140 comes off.

The light source 72 is such as to emit light in the wavelength range of blue, and the fluorescent plate 130 includes the fluorescent material layer 131 for emitting light in the wavelength range of red by absorbing the light and the fluorescent material layer 131 for emitting light in the wavelength range of green by absorbing the light.

Next, an embodiment of the invention will be described based on the drawings.

FIG. 1 is a perspective view showing an external appearance of a projector 10. When used in this embodiment, left and right denote left and right directions with respect to a projecting direction, and front and rear denote front and rear directions with respect to a traveling direction of a light beam. As is shown in FIG. 1, the projector 10 has a substantially rectangular parallelepiped shape and has a lens cover 19 which covers a projection port which lies to a side of a front panel 12 which is referred to as a front side panel of a main body case, as well as a plurality of outlet holes 17 in the front panel 12. Further, although not shown, the projector 10 includes an Ir reception part for receiving a control signal from a remote controller.

In addition, a keys/indicators part 37 is provided on an upper side panel 11 which constitutes the main body case, and disposed on this keys/indicators part 37 are keys and indicators which include a power supply switch key, a power indicator which informs whether the power supply is on or off, a projection switch key which switches on or off projection, an overheat indicator which informs of an overheat condition when the light source unit, the display device or the control circuit overheats and the like.

Further, provided on a back side or a back side panel of the main body case are an input/output connectors part where USB terminals, an image signal input D-SUB terminal, an S terminal, an RCA terminal and the like are provided and various types of terminals 20 including a power supply adaptor plug and the like. A plurality of inlet holes 18 are formed in proximity to lower portions of a right-hand side panel 14 which constitutes a side panel, not shown, of the main body case and a left-hand side panel 15 which is a side panel shown in FIG. 1.

Next, a projector control means of the projector 10 will be described by use of the block diagram in FIG. 2. The projector control means is made up of a control unit 38, an input/output interface 22, an image transform part 23, a display encoder 24, a display drive part 26 and the like. Image signals of various standards inputted from an input/output connector part 21 are sent via the input/output interface 22 and a system bus (SB) to the image transform part 23 where the image signals are transformed so as to be unified into an image signal of a predetermined format suitable for display and are thereafter outputted to the display encoder 24.

The display encoder 24 deploys the image signal inputted thereinto on a video RAM 25 for storage and generates a video signal from the contents stored in the video RAM 25, outputting the video signal so generated to the display drive part 26.

The display drive part 26 drives a display device 51 which is a spatial optical modulator (SOM) at an appropriate frame rate in accordance with the image signal outputted from the display encoder 24. A light beam emitted from the light source unit 63 is caused to enter the display device 51 via a light source side optical system to thereby form an optical image by reflected light from the display device 51, and the optical image so formed is then projected on to a screen, not shown, for display via a projection system lens group which is referred to as a projection side optical system. A movable lens group 97 of the projection side optical system is driven by a lens motor 45 for zooming or focusing.

An image compression/expansion part 31 performs a recording operation in which an intensity signal and a color-difference signal of the image signal are data compressed through processings such as ADCT and Huffman coding so as to write them sequentially on a memory card 32 which is referred to as a detachable recording medium. Further, when in a reproducing mode, the image compression/expansion part 31 reads out image data recorded on the memory card 32, expands individual image data which make up a series of time-varying images frame by frame, and outputs the image data to the display encoder 24 via the image transform part 23 so as to enable the display of time-varying images based on the image data stored on the memory card 32.

The control unit 38 is such as to govern operations of respective circuitries within the projector 10 and is made up of a CPU, a ROM which stores in a fixed fashion operation programs of various types of settings and a RAM which is used as a work memory.

Operation signals from the keys/indicators part 37 which is made up of the main keys and indicators provided on the upper side panel 11 of the main body case are sent directly to the control unit 38, while key operation signals from the remote controller are received by the Ir reception part 35, and a code signal demodulated at an Ir processing part 36 is outputted to the control unit 38.

In addition, a voice processing part 47 is connected to the control unit 38 via the system bus (SB). This Voice processing part 47 includes a sound source circuit such as a PCM sound source. When in a projection mode and a reproducing mode, the voice processing part 47 converts voice data into analog signals and drives a speaker 48 to output loudly sound or voice based on the voice data.

The control unit 38 controls a power supply control circuit 41, and this power supply control circuit 41 illuminates a light source of the light source unit 63 when the power supply switch is operated. Further, the control unit 38 causes a cooling fan drive control circuit 43 to detect temperatures through a plurality of sensors which are provided at the light source unit 63 and the like so as to control the rotational speed of a cooling fan based on the results of the temperature detection. The control unit 38 also causes the cooling fan drive control circuit 43 to make the cooling fan continue to rotate even after the power supply of the projector main body is switched off by use of a timer or the like and controls the power supply to the projector main body to be cut off depending upon the results of the temperature detection by the temperature sensors.

Figure 3:
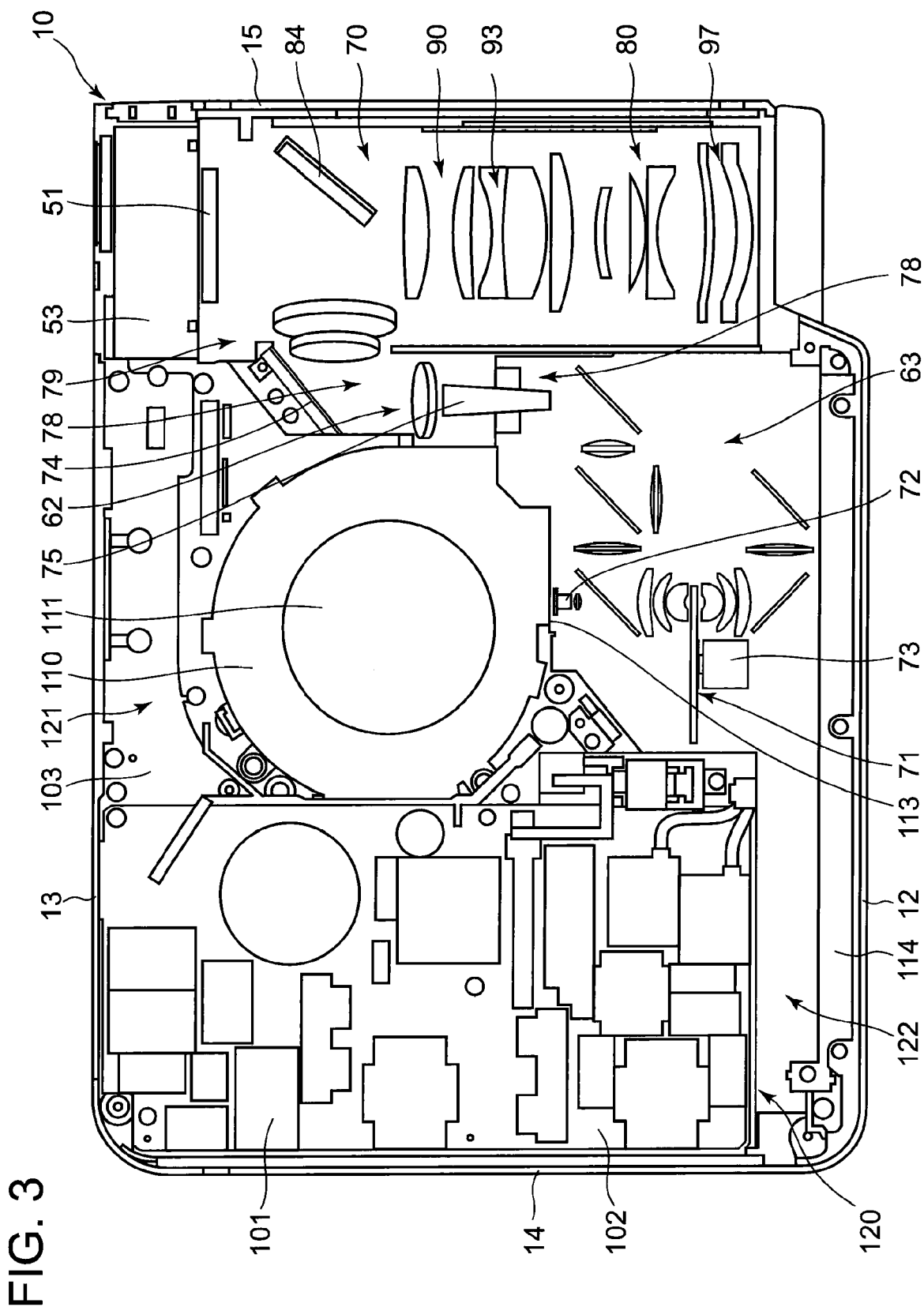
FIG. 3 is an exemplary plan view showing an internal construction of the projector utilizes the light source unit according to the invention.

Next, an internal construction of the projector 10 will be described. FIG. 3 is an exemplary plan view showing an internal construction of the projector 10. As is shown in FIG. 3, in the projector 10, a power supply control circuit board 102 on which a power supply circuit block 101 and the like are mounted is disposed in proximity to the right-hand side panel 14 and a sirocco fan-type blower 110 is disposed substantially at a center in the projector 10. In addition, a control circuit board 103 is disposed in proximity to the blower 110, and the light source 63 is disposed in proximity to the front panel 12, an optical system unit 70 being disposed in proximity to the left-hand side panel 15. In addition, an interior of a housing of the projector 10 is divided airtightly into an inlet side space compartment 121 which lies on the back panel 13 side and an outlet side space compartment 122 which lies on the front panel 12 side by a portioning bulkhead 120. The blower 110 is disposed so that its inlet port 111 is positioned in the inlet side space compartment 121 and its outlet port 113 is positioned on a boundary between the outlet side space compartment 122 and the inlet side space compartment 121.

The optical system unit 70 has a substantially U-shape and is made up of three blocks such as an illumination side block 78 which is positioned in proximity to the light source unit 63, an image generation block 79 which is positioned on the back panel 13 side, and a projection side block 80 which is positioned between the illumination side block 78 and the left-hand side panel 15.

The illumination side block 78 includes part of a light source side optical system 62 for guiding light emitted from the light source unit 63 to the display device 51 which is possessed by the image generation block 79. A light smoothing or light guiding device 75 for making a light beam emitted from the light source 63 into a light beam whose intensity is uniformly distributed and a condensing lens for concentrating light that has been transmitted through the light guiding device 75 are included in the light source side optical system 62 that is possessed by the illumination side block 78.

The image generating block 79 has, as the light source side optical system 62, an optical axis varying mirror 74 for varying a direction of an optical axis of the light beam emitted from the light guiding device 75, a plurality of condensing lenses for concentrating light reflected by the optical axis varying mirror 74 on to the display device 51 and a shining mirror 84 for shining the light beam that has been transmitted through the condensing lenses on to the display device 51 at a predetermined angle. Further, the image generating block 79 includes a DMD which constitutes the display device 51, and a display device heatsink or cooling device 53 for cooling the display device 51 is disposed on a back panel 13 side of the display device 51, so as to prevent the display device 51 from being heated to a high temperature.

The projection side block 80 has a lens group of a projection side optical system 90 which projects light on to the screen, which light is reflected by the display device 51 to form an image. The projection side optical system 90 is referred to as a variable focus lens made up of a fixed lens group 93 which is incorporated in a fixed lens barrel and a movable lens group 97 which is incorporated in a movable lens barrel and having a zooming function, and zooming and focusing operations are enabled by moving the movable lens group 97 by a lens motor.

In the internal construction of the projector 10, members whose temperatures are lower than that of the light source unit 63 are disposed within the inlet side space compartment 121.

Specifically, disposed in the inlet side space compartment 121 are the power supply control circuit board 102, the blower 110, the control circuit board 103, the image generating block 79 of the optical system unit 70, the projection side block 80 of the optical system unit 70, and the condensing lenses of the illumination side block 78 of the optical system unit 70.

On the other hand, disposed within the outlet side space compartment 122 are the light source unit 63 whose temperature is increased to a relatively high temperature, the light guiding device 75 of the illumination side block 78 of the optical system unit 70, and an outlet temperature decreasing device 114.

The light source unit 63 includes a light emitting wheel 71 for emitting light in wavelength ranges for red, green and blue which constitute the three primary colors of light to the light guiding device 75 by receiving directional light, a wheel motor 73 for driving to rotate the light emitting wheel 71 and a light source 72 for shining light in the wavelength range of blue to the light emitting wheel 71. This light source 72 is disposed parallel to an optical axis of the light guiding device 75, and the light emitting wheel 71 is disposed so that the optical axis of the light source 72 and a wheel plane of the light emitting wheel 71 intersect at right angles in proximity to the front side panel 12. This light emitting wheel 71 is configured so as to emit red fluorescent light and green fluorescent light to the light source 72 side and transmit blue light from the light source 72 for emission towards the front side panel 12 side.

Figure 4:
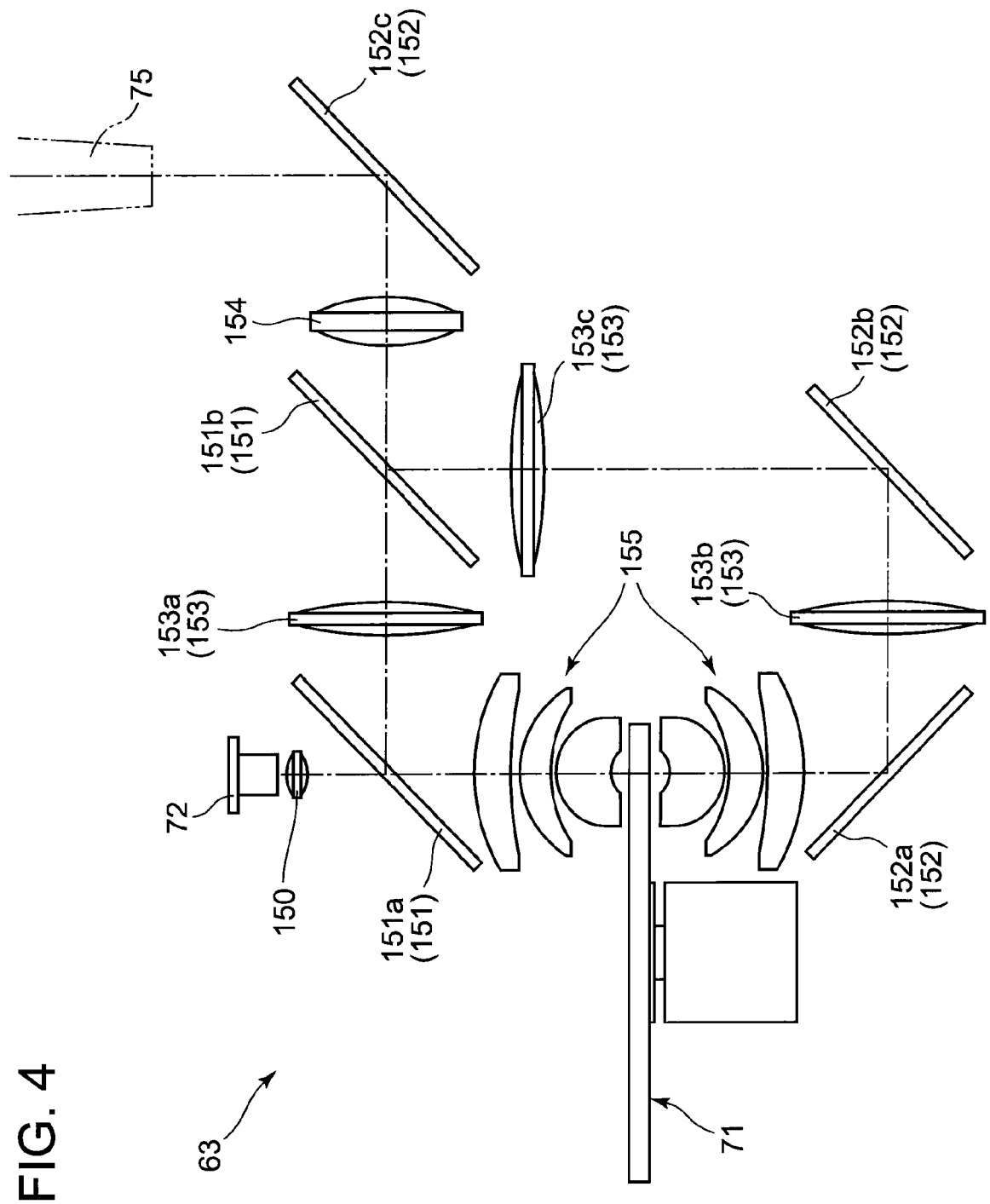
FIG. 4 is an exemplary plan view of the light source unit according to the invention.

As is shown in FIG. 4, the light source unit 63 includes a collimator lens 150 which is disposed on an emerging side of the light source 72 to convert light emitted from the light source 72 into parallel light. The light source unit 63 also includes a condensing optical system which is made up of dichroic mirrors 151 which let light in a predetermined wavelength range pass through and reflects light in the other wavelength ranges which are emitted from the light emitting wheel 71 and aligning optical axes of the respective colors of light emitted from the light emitting wheel 71 into the same optical axis and reflecting mirrors 152, and convex lenses 153 for concentrating light beams which are emitted from the light emitting wheel 71 to be incident on the light guiding device and the like.

Hereinafter, the condensing optical system of the embodiment will be described. A primary dichroic mirror 151a is disposed between the light source 72 and the light emitting wheel 71 and lets blue light from the light source 72 pass through and changes directions of red and green lights emitted from the light emitting wheel 71 at 90 degrees for reflection. A primary reflecting mirror 152a is disposed on a blue light emerging side of the light emitting wheel 71 which constitutes a position where light from the light source 72 has passed through the light emitting wheel 71 to change the direction of blue light from the light emitting wheel 71 at 90 degrees for reflection. A secondary reflecting mirror 152b is disposed so as to confront the primary reflecting mirror 152a to change the direction of the blue light which is reflected by the primary reflecting mirror 152a for another 90 degrees only for reflection. A secondary dichroic mirror 151b is disposed in a position where the optical axes of the red and green lights reflected by the primary dichroic mirror 151a and the optical axis of the blue light reflected by the secondary reflecting mirror 152b intersect each other at right angles. The secondary dichroic mirror 151b lets the red and green lights which have been reflected by the primary dichroic mirror 151a pass through to travel straight ahead and reflects the blue light which has been reflected by the secondary reflecting mirror 152b so that the direction of the blue light is changed only at 90 degrees. A tertiary reflecting mirror 152c is disposed in a position where the optical axes of the respective colors of light emerging from the secondary dichroic mirror 151b and the optical axis of the light guiding device 75 intersect each other at right angles. The tertiary reflecting mirror 152c changes the directions of the respective colors of light emerging from the secondary dichroic mirror 151b at 90 degrees towards the light guiding device 75 side for reflection.

By disposing the dichroic mirror 151 and the reflection mirrors 152 in the way described above, the directions of the optical axes of the respective colors of light emitted from the light emitting wheel 71 can be changed so as to coincide with the optical axis of the light guiding device 75. As a result, light emitted from the light emitting wheel 71 is reflected on and passes through the respective mirrors repeatedly for incidence on the light guiding device 75.

Condensing lens groups 155 are disposed individually in proximity to front and rear surfaces of the light emitting wheel 71, whereby light emitted from the light source 72 is shone on to the light emitting wheel 71 in a concentrated state and light beams emitted from the front and rear surfaces of the light emitting wheel are also concentrated. Further, a primary convex lens 153a is disposed between the primary dichroic mirror 151a and the secondary dichroic mirror 151b, and a secondary convex lens 153b is disposed between the primary reflecting mirror 152a and the secondary reflecting mirror 152b. In addition, a tertiary convex lens 153c is disposed between the secondary dichroic mirror 151b and the secondary reflecting mirror 152b, and further, a light guiding device incident lens 154 is disposed between the secondary dichroic mirror 151b and the tertiary reflecting mirror 152c. Light emitted from the light emitting wheel 71 is to be incident on the light guiding device 75 as a light beam which is concentrated further.

Namely, in this light source unit 63, when light from the light source 72 is shone on to the light emitting wheel 71, light in a predetermined wavelength range is emitted from fluorescent materials contained in fluorescent material layers 131, which will be described later, or a diffusion layer 141, and the light so emitted is then incident on the light guiding device 75 via the condensing optical system.

Figure 5:
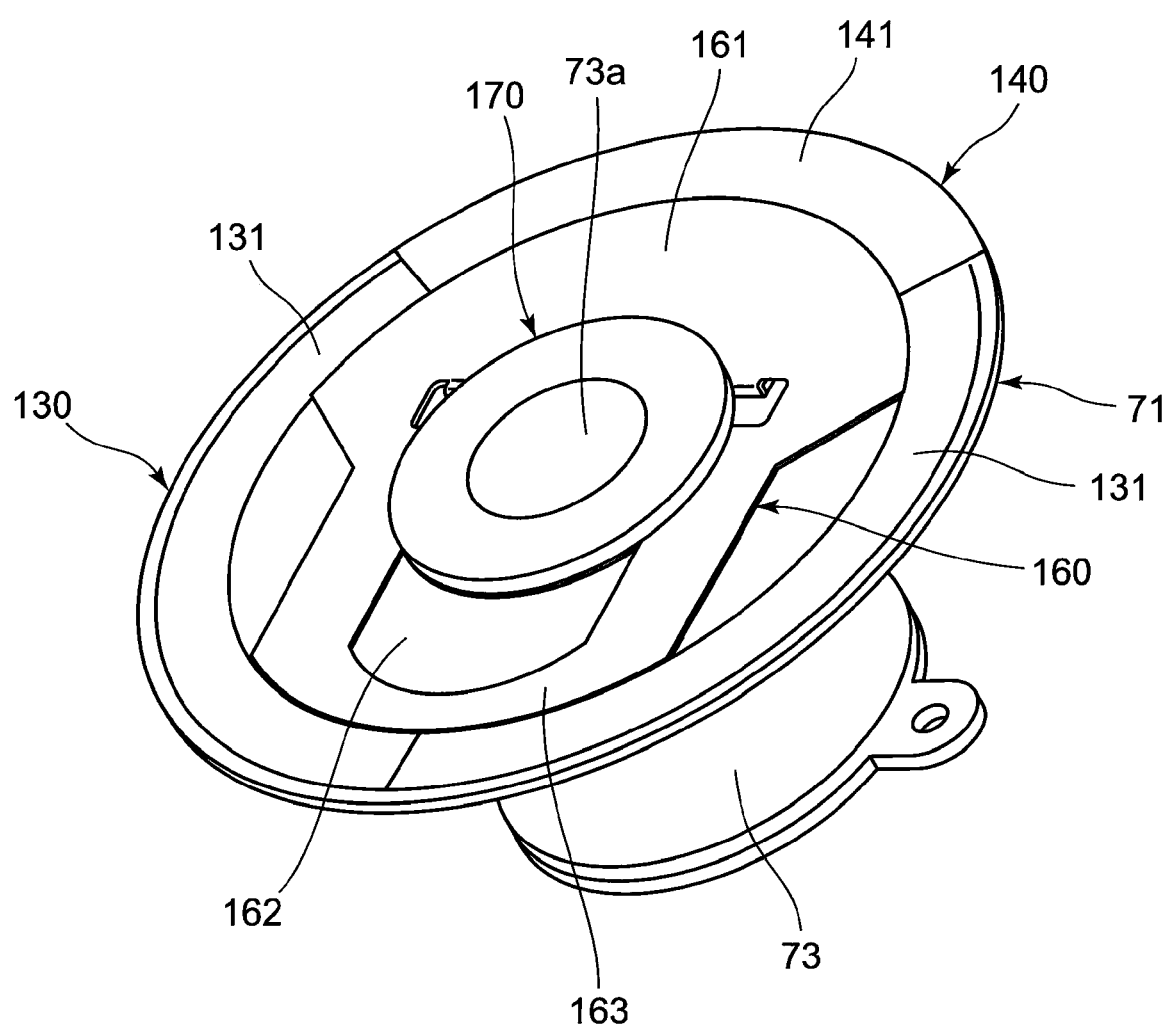
FIG. 5 is a perspective view showing external appearances of a light emitting wheel, a wheel motor and a light cut-off plate of the light source unit according to the invention.
Figure 6:
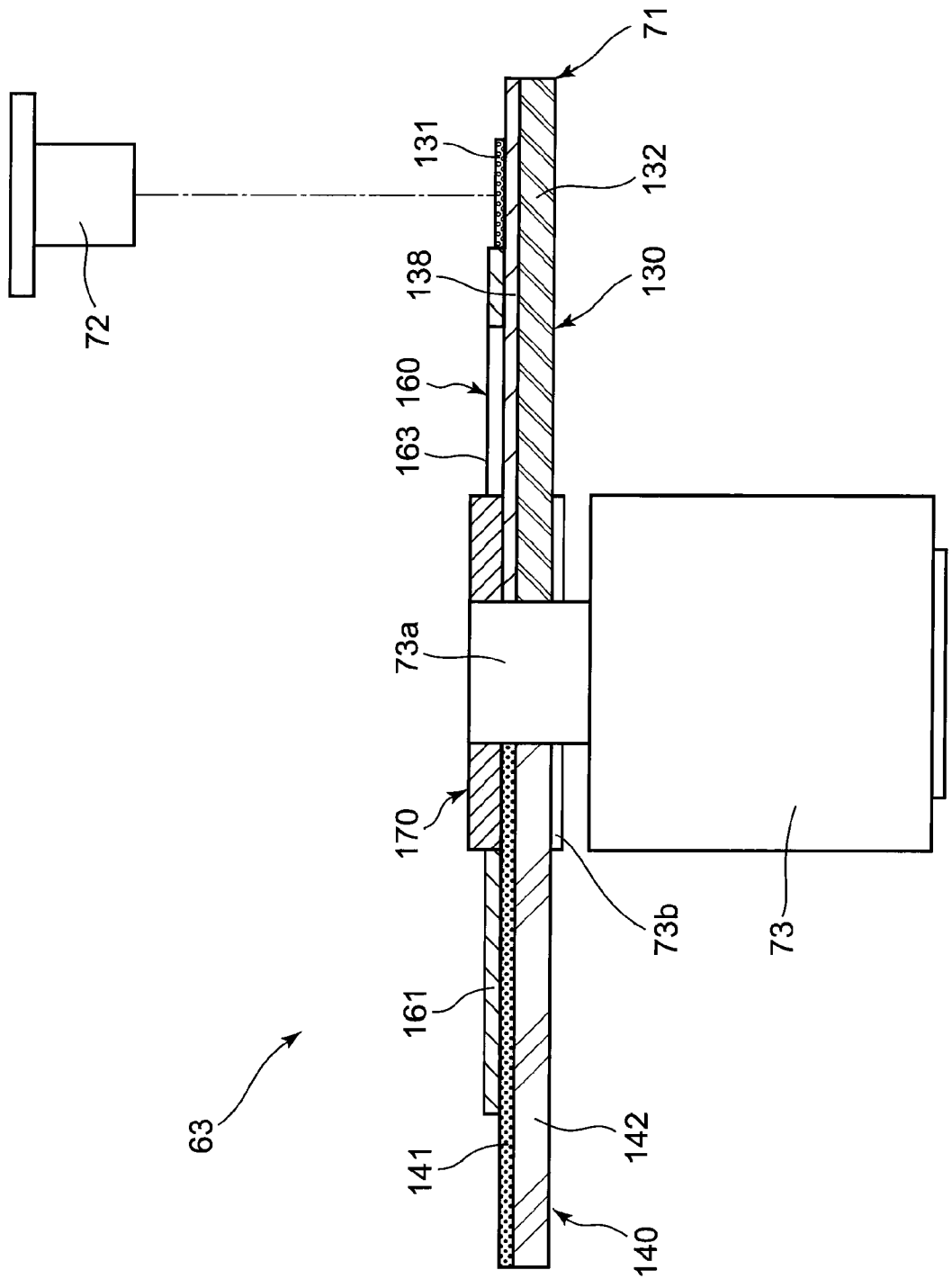
FIG. 6 is a partially cutaway exemplary plan view showing the light source unit according to the invention.
Figure 7:
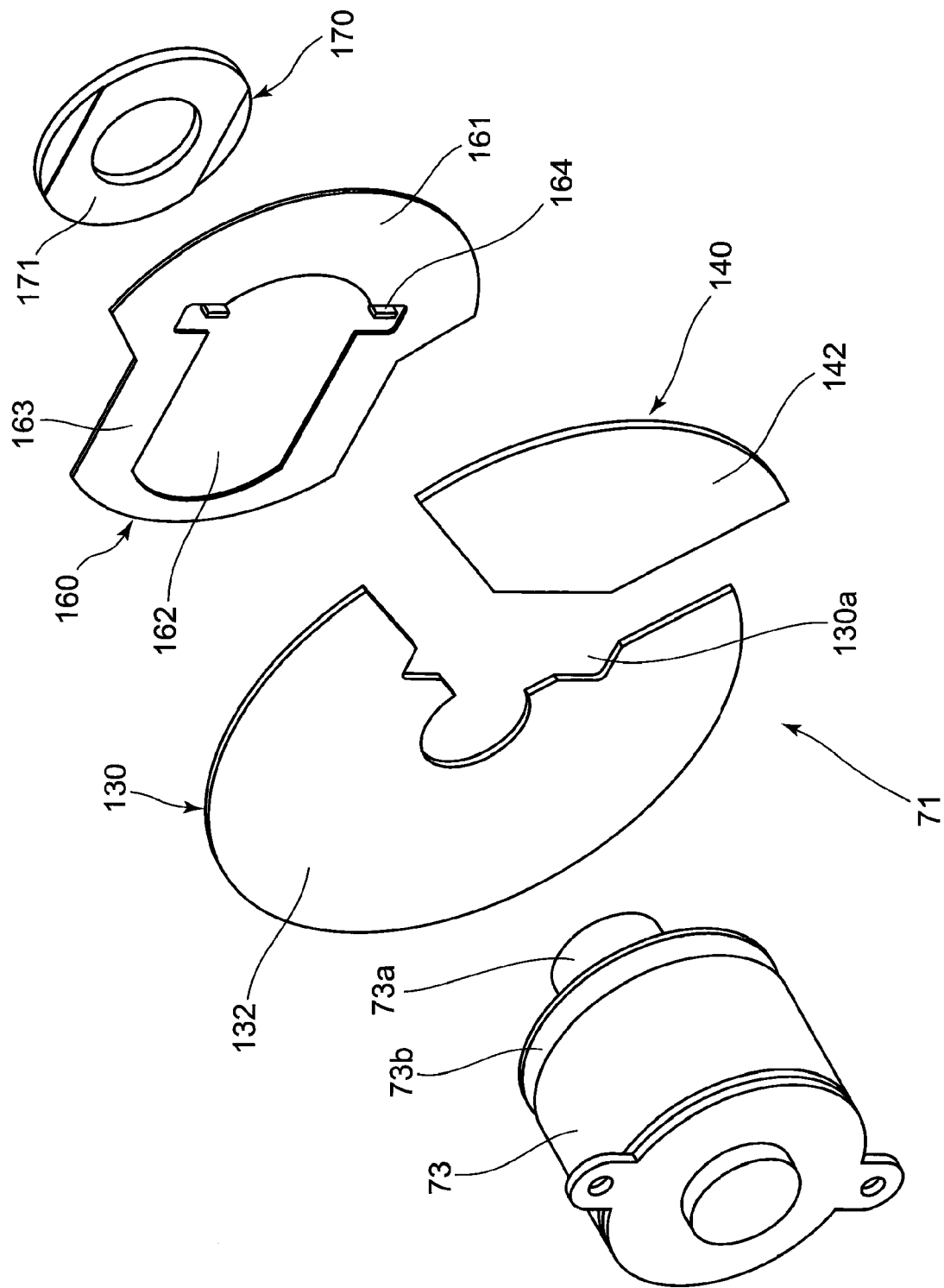
FIG. 7 is an exploded perspective view showing the light emitting wheel, the wheel motor and the light cut-off plate of the light source unit according to the invention.

As is shown in FIGS. 5 to 7, a fan-shaped fluorescent plate 130 and a fan-shaped diffusion plate 140 are formed integrally by being fixedly bonded to a motor hub 73b provided on a rotating shaft 73a of the wheel motor 73. On the fluorescent plate 130, different fluorescent material layers 131 are disposed so as to lie adjacent in a circumferential direction, and a diffusion layer 141 is disposed on the diffusion plate 140 so as to lie adjacent to the fluorescent material layers 131. Boundary planes between the fluorescent plate 130 and the diffusion plate 140 are also bonded. A cutout is provided at a boundary portion of the florescent plate 130 with the diffusion plate 140 which lies in proximity to the rotating shaft 73a, and the cutout is sized to enable the insertion of an engagement claw of a light cut-off plate, which will be described later.

Specifically, the light emitting wheel 71 is made up of the fluorescent plate 130 in which the fluorescent material layers 131 are disposed on a light source 72 side surface of an opaque base material 132 which is formed of a heat conductive member such as a copper or aluminum plate and the diffusion plate 140 in which a diffusion layer 141 is disposed on a light source 72 side of a transparent base material 142 which is a glass base material or a transparent resin base material. In addition, the light emitting wheel 71 has a circular opening which is formed in a central portion of the fluorescent plate 130, and the circular opening matches the shape of the cylindrical rotating shaft 73a which constitutes a connecting portion with the wheel motor 73. The rotating shaft 73a is securely inserted in the circular opening, and the motor hub 73b is bonded to the proximity to central portions of the fluorescent plate 130 and the diffusion plate 140 whereby the fluorescent plate 130 and the diffusion plate 140 are formed integral.

By adopting this configuration, the light emitting wheel 71 is allowed to rotate integrally at a rotating speed of 120 revolutions per second by the wheel motor 73 which constitutes a driving device which is controlled to be driven by the control unit 38 of the projector control means.

The fluorescent plate is formed by coating belt-like fluorescent material layers 131 so as to lie adjacent in the circumferential direction in proximity to an outer circumferential portion of the fan-shaped opaque base material 132 which has a superior arc which is an arc equal to or larger than a semicircle. Specifically, on this fluorescent plate 130, a red fluorescent material layer 131 is formed which absorbs directional light from the light source 72 as excitation light and emits light in the wavelength range of red, which is one of the primary colors, by the light from the light source 72 being so absorbed. Similarly, on the fluorescent plate 130, a green fluorescent material layer 131 is formed so as to lie adjacent to the red fluorescent material layer which absorbs directional light from the light source 72 as excitation light and emits light in the wavelength range of green, which is another primary color, by the light from the light source 72 being so absorbed. These fluorescent material layers 131 are made up of a fluorescent crystal and a binder.

On the opaque base material 132, a reflection layer 138 is formed over an overall surface on a side where the fluorescent material layers 131 are to be attached through silver deposition or the like, and this reflection layer 139 reflects blue light from the light source 72 and red and green lights which are generated by the respective florescent materials, and the fluorescent material layers 131 are formed on the reflection layer 138.

In addition, on the diffusion plate 140, an optical treatment such as a roughening treatment through blasting is applied to an overall surface on one side of the fan-shaped transparent base material 142 having an inferior arc which is an arc of about one third of a circle, whereby the diffusion layer 141 is formed which imparts a diffusion effect to incident light. Namely, the diffusion layer 141 is disposed to lie adjacent to the fluorescent material layers 131 by the diffusion plate 140 being disposed to lie adjacent to the florescent plate 130. As the diffusion layer 141, in addition to the case where the optical treatment is applied to the surface of the transparent base material 142, a diffusion layer 141 may be formed by securing belt-like solid materials which are optical materials. In addition, the diffusion layer 141 is not formed on the light source 72 side of the light emitting wheel 71 but may be formed on a surface on an opposite side of the light emitting wheel 71.

The light source 72 shines directional light to the fluorescent material layers 131 and the diffusion layer 141 which are disposed in proximity to outer circumferential portions of the opaque base material 132 and the transparent base material 142. The light source 72 is a laser emitter which emits visible light in the wavelength range of blue whose wavelength is shorter than light in the wavelength ranges of red and green which is emitted from the red and green fluorescent material layers 131.

Next, emitted light will be described which is emitted from the light emitting wheel 71 and is incident on the light guiding device 75. When directional light is emitted from the light source 72 to the red fluorescent material layer 131, a fluorescent material on the red fluorescent material layer 131 absorbs the directional light and emits light in the wavelength range of red to all directions. In the light so emitted, red light emitted towards the light source 72 is incident directly on the light guiding device 75 via the condensing optical system, and red light emitted to the opaque base material 132 side is reflected by the reflection layer 138, and much of the reflected light is incident on the light guiding device 75 via the condensing optical system as emitted light from the light emitting wheel 71.

Similarly, when directional light is shone on to the green fluorescent material layer 131 fro the light source 72, light in the wavelength range of green is emitted as emitted light therefrom and is incident on the light guiding device 75.

When light which is light in the wavelength range of blue is shone on to the diffusion layer 141 from the light source 72, since a diffusion effect is imparted to the incident light in the wavelength range of blue by the diffusion layer 141, blue light is emitted from the diffusion layer 141 as a diffuse light which is similar to light (red light and green light) emitted from the fluorescent material layers 131 and the blue light is incident on the light guiding device 75 via the condensing optical system.

By this configuration, when the light emitting wheel 71 is rotated and directional light is emitted from the light source 72, beams of light in the wavelength ranges of red, green and blue are emitted from the light emitting wheel 71 to be incident on the light guiding device 75 sequentially via the condensing optical system, and the DMD, which is the display device 51 of the projector, time-shares the respective colors of light in accordance with data for display to thereby enable a color image to be generated on a screen.

Then, as is shown in FIGS. 5 and 7, a light cut-off plate 160 is disposed on surfaces of the fluorescent plate 130 and the diffusion plate 140. The light cut-off plate 160 is designed to move to the diffusion plate 140 side when the diffusion plate 140 comes off so as to cover an area on the diffusion plate 140 where light is to be shone so that light from the light source 72 is not directly incident on the light guiding device 75.

This light cut-off plate 160 is pressed towards the fluorescent plate 130 side by a cap 170 and is held by the cap 170 and the fluorescent plate 130 and the diffusion plate 140 therebetween. Further, by engagement claws 164 of the light cut-off plate 160 being brought into engagement with the diffusion plate 140, the light cut-off plate 160 is held so that the light cut-off portion 161 is not disposed on the optical axis of the light source 72.

Specifically, the light cut-off plate 160 has the fan-shaped light cut-off portion 161 which is formed into a size which can cover the area on the diffusion plate 140 where light is to be shone, a frame portion 163 which extends from the light cut-off portion 161, a sliding opening 162 which is fitted on a projecting portion 171 which is formed on the cap 170 and the engagement claws 164 which fit in the diffusion plate 140.

Two confronting sides of the projecting portion 171 of the cap 170 are formed parallel. The sliding opening 162 in the light cut-off plate 160 is formed so as to allow the light cut-off plate 160 to slide only in one direction relative to the cap 170 when the projecting portion 171 fits in the sliding opening 162. The light cut-off plate 160 is formed so that a mass of a light cut-off portion 160 side is larger than a mass on a frame portion 163 side thereof, whereby the light cut-off plate 160 is allowed to move to the light cut-off portion side when the engagement state between the engagement claws 164 and the diffusion plate 140 is released while the light emitting wheel 71 is rotating.

The engagement claws 164 are formed in proximity to an end portion of the sliding opening 162 which lies to face the light cut-off portion 161 so as to be brought into engagement with the diffusion plate 140 in proximity to the rotating shaft 73a of the wheel motor 73. By the engagement claws 164 being inserted from cutouts 130a in the fluorescent plate 130 so that inner end portions of the engagement claws 164 are brought into engagement with lateral side surfaces (radial portions) of the diffusion plate 140, the light cut-off plate 160 is put into an engaged state in which the light cut-off plate 160 is locked by the diffusion plate 140. Namely, these engagement claws 164 hold the light cut-off plate 160 in a predetermined position on the light emitting wheel 71 so that the light cut-off plate 160 does not slide towards the light cut-off portion 161 side while the light emitting wheel 71 is rotating. Namely, the light cut-off plate 160 can rotate together with the fluorescent plate 130 and the diffusion plate 140 by being locked by the diffusion plate 140.

An engagement method of the light cut-off plate 160 with the diffusion plate 140 is not limited to a method in which the cutouts 130a are provided in the fluorescent plate 130 for insertion of the engagement claws 164, but various configurations can be adopted which include a method in which cutouts, recess portions or through holes are provided on the diffusion plate 140 side so that the engagement claws 164 are brought into engagement with the diffusion plate 140. In addition, the number of engagement claws 164 is not limited to two for engagement of the light cut-off plate 160 with the diffusion plate 140.

Hereinafter, an operation of the light cut-off plate 160 will be described by reference to FIG. 8. While the light emitting wheel 71 is rotating, the engagement claws 164 engage with lateral sides of the diffusion plate 140 as is shown in FIG. 8(a) to hold the light cut-off plate 160 so that the light cut-off plate 160 is not caused to move outwards by virtue of centrifugal force.

Then, the diffusion plate 140 comes off due to the bonding force being reduced because of deterioration with age or the like, the light cut-off plate 160, which is locked by the diffusion plate 140 until then, slides outwards along the projecting portion 171 of the cap 170 by virtue of centrifugal force. Then, by the frame portion 163 in proximity to an end portion of the sliding opening 162 being caught on the cap 170, the light cut-off plate 160 is fixed in such a state that the area on the diffusion plate 140 where high-output light is shone from the light source 72 is covered by the light cut-off portion 161. By doing so, directional high-output light from the light source 72 is cut off by the light cut-off portion 161, whereby the high-output light is prevented from being directly incident on the light guiding device 75 to be emitted to the outside of the projector 10.

Even in the event that the diffusion plate 140 comes off in a forcible fashion, by forming the diffusion layer 141 on the overall surface of the diffusion plate 140, the coming off motion of the diffusion plate 140 substantially coincides with the emerging action of the light cut-off plate 160, and light emitted from the light source 72 can be diffused by making use of the diffusion layer 141 on a central portion side of the diffusion plate 140. By doing so, the emission of directional light towards the outside of the projector can be prevented in an ensured fashion.

In this way, with this light source unit 63, light from the light source 72 can be cut off by the light cut-off portion 161 by moving the light cut-off plate 160 when the diffusion plate 140 comes off. Therefore, high-output light can be prevented from being emitted to the outside of the projector in the ensured fashion when the diffusion plate 140 comes off. In addition, by the light source unit 63 being provided, there is no need to provide a detection means such as a sensor or a control means for cutting off light or stopping the light source on the projector 10 in which the light source unit 63 is mounted. Thus, the projector 10 can be provided which is simple in configuration and which is free from an erroneous operation or no actuation that would otherwise occur due to a defective circuitry.

According to the invention, even in the event that the diffusion plate 140 comes off as in the way described above, high-output light can be cut off. However, a configuration may be adopted in which the disconnection of the diffusion plate 40 or movement of the light cut-off plate 160 is detected in association with the occurrence of a light cutting off operation so as to stop the output of the light source 72. In addition, a configuration may also be adopted in which as what is described above occurs, an alarm means is provided for informing the user of the occurrence of an anomaly and a countermeasure thereagainst by means of voice or display on the screen.

In place of the opaque base material 132, a light transmissive transparent base material may be adopted for the fluorescent plate 130 which includes the fluorescent material layers 131. Then, a dichroic layer for letting blue light pass through and reflecting red and green fluorescent lights from the fluorescent materials may be formed on a blue light incident surface of the transparent base material, and the fluorescent material layers 131 emitting red and green lights may be disposed on an opposite side. By disposing the dichroic layer and the fluorescent layers in the way described above, by shining directional light from the light source 72 on to the fluorescent materials, red and green fluorescent lights can be emitted on the opposite side to the light source 72 so as to be incident on the light guiding device 75.

Fluorescent material layers 131 that are to be disposed on the fluorescent plate 130 are not limited to the red and green fluorescent material layers 131, and hence, three or more fluorescent material layers 131 can be disposed which can emit light in wavelength ranges of yellow, cyan and the like.

In addition, only the green fluorescent material layer 131 may be disposed on the fluorescent plate 130. When such the configuration is adopted, it is preferable to provide an LED light source for emitting light in the wavelength range of red.

The invention is not limited to the embodiment that has been described heretofore but can be modified and/or improved variously without departing from the spirit and scope of the invention.

While the various typical modes for carrying out the invention have been described, the invention is not limited thereto. Consequently, the scope of the invention is limited only by the claims thereof.

Figure 2:
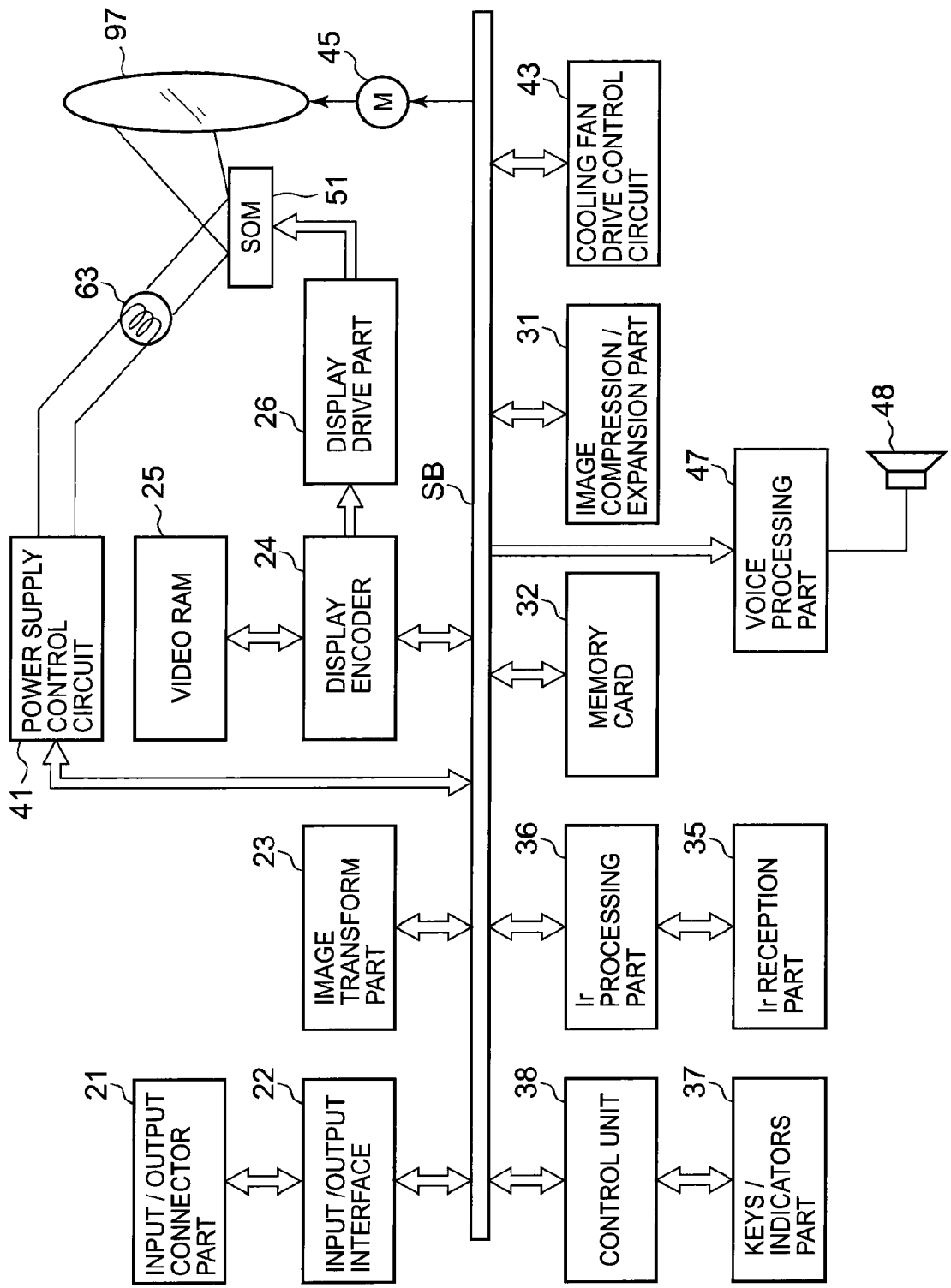
FIG. 2 is a functional circuit block diagram of the projector according which utilizes the light source unit according to the invention.

FIG. 2
21: input/output connector part
22: input/output interface
23: image transform part
24: display encoder
25: video RAM
26: display drive part
31: image compression/expansion part
32: memory card
35: Ir reception part
36: Ir processing part
37: keys/indicators part
38: control unit
41: power supply control circuit
43: cooling fan drive control circuit
47: voice processing part

What is claimed is:
1. A light source unit comprising:
a fluorescent plate on which a fluorescent material layer for emitting light in a predetermined wavelength range when light is shone thereonto is disposed;
a diffusion plate on which a diffusion layer for emitting light in a diffusing fashion is disposed so as to lie adjacent to the fluorescent material layer;
a light source for shining the light onto the fluorescent material layer and the diffusion layer;

a driving device for rotating the fluorescent plate and the diffusion plate together; and a light cut-off plate which is formed into a size which covers an area on the diffusion plate where the light is to be shone, wherein the light cut-off plate is rotatable together with the fluorescent plate and the diffusion plate by being locked in a locked state by the diffusion plate, and wherein the light cut-off plate is configured such that when the diffusion plate comes off, the locked state is released, and the light cut-off plate moves to cover an area corresponding to the area on the diffusion plate where the light was shone from the light source before the diffusion plate came off.

2. A light source unit as set forth in claim 1, wherein a plurality of the fluorescent material layers for emitting light in different wavelength ranges are disposed on the fluorescent plate adjacent to each other in a circumferential direction.

3. A light source unit as set forth in claim 1, comprising further:

detection means for detecting the diffusion plate coming off, wherein when the detection means detects the coming off of the diffusion plate, the output of the light source is stopped.

4. A light source unit as set forth in claim 1, wherein the light source is configured to emit laser light in the wavelength range of blue, and wherein the fluorescent material layer comprises a fluorescent material layer for emitting light in the wavelength range of red when the laser light is shone thereon and a fluorescent material layer for emitting light in the wavelength of green when the light is shone thereon.

5. A projector comprising:
the light source unit as set forth in claim 1,
a display device,
a cooling fan,
a light source side optical system for guiding light from the light source unit to the display device,
a projection side optical system for projecting an image emitted from the display device onto a screen, and
projector control means for controlling the light source unit and the display device.

6. A light source unit as set forth in claim 2, comprising further:

detection means for detecting the diffusion plate coming off, wherein when the detection means detects the coming off of the diffusion plate, the output of the light source is stopped.

7. A light source unit as set forth in claim 2, wherein the light source is configured to emit laser light in the wavelength range of blue, and wherein the fluorescent material layers comprise a fluorescent material layer for emitting light in the wavelength range of red when the laser light is shone thereon and a fluorescent material layer for emitting light in the wavelength of green when the light is shone thereon.

8. A light source unit as set forth in claim 3, wherein the light source is configured to emit laser light in the wavelength range of blue, and wherein the fluorescent material layer comprises a fluorescent material layer for emitting light in the wavelength range of red when the laser light is shone thereon and a fluorescent material layer for emitting light in the wavelength of green when the light is shone thereon.

9. A projector comprising:
the light source unit as set forth in claim 2,
a display device,
a cooling fan,
a light source side optical system for guiding light from the light source unit to the display device,
a projection side optical system for projecting an image emitted from the display device onto a screen, and
projector control means for controlling the light source unit and the display device.

10. A projector comprising:
the light source unit as set forth in claim 3,
a display device,
a cooling fan,
a light source side optical system for guiding light from the light source unit to the display device,
a projection side optical system for projecting an image emitted from the display device onto a screen, and
projector control means for controlling the light source unit and the display device.

11. A projector comprising:
the light source unit as set forth in claim 4,
a display device,
a cooling fan,
a light source side optical system for guiding light from the light source unit to the display device,
a projection side optical system for projecting an image emitted from the display device onto a screen, and
projector control means for controlling the light source unit and the display device.

12. A projector comprising:
the light source unit as set forth in claim 6,
a display device,
a cooling fan,
a light source side optical system for guiding light from the light source unit to the display device,
a projection side optical system for projecting an image emitted from the display device onto a screen, and
projector control means for controlling the light source unit and the display device.

13. A projector comprising:
the light source unit as set forth in claim 7,
a display device,
a cooling fan,
a light source side optical system for guiding light from the light source unit to the display device,
a projection side optical system for projecting an image emitted from the display device onto a screen, and
projector control means for controlling the light source unit and the display device.

14. A projector comprising:
the light source unit as set forth in claim 8,
a display device,
a cooling fan,
a light source side optical system for guiding light from the light source unit to the display device,
a projection side optical system for projecting an image emitted from the display device onto a screen, and
projector control means for controlling the light source unit and the display device.

* * * * *

UNITED STATES PATENT AND TRADEMARK OFFICE
CERTIFICATE OF CORRECTION

PATENT NO. : 8,157,398 B2
APPLICATION NO. : 12/731202
DATED : April 17, 2012
INVENTOR(S) : Kyo Yamamoto It is certified that error appears in the above-identified patent and that said Letters Patent is hereby corrected as shown below:

Title Page, insert:

Item --(30) Foreign Application Priority Data

Mar. 27, 2009 (JP) ....................2009-079857--.

Signed and Sealed this
Sixteenth Day of October, 2012

David J. Kappos
*Director of the United States Patent and Trademark Office*